United States Patent [19]

Grant

[11] Patent Number: 5,007,738

[45] Date of Patent: Apr. 16, 1991

[54] INTERFEROMETRIC TEST STANDARD

[76] Inventor: Ralph M. Grant, 4480 Sheldon Rd., Rochester, Mich. 48308-1006

[21] Appl. No.: 493,218

[22] Filed: Mar. 14, 1990

[51] Int. Cl.⁵ .............................................. G01B 9/02
[52] U.S. Cl. .................................... 356/347; 356/243; 356/35.5; 73/800
[58] Field of Search ............. 356/345, 347, 354, 35.5, 356/243; 73/800

[56] References Cited

U.S. PATENT DOCUMENTS

| | | | |
|---|---|---|---|
| 3,649,127 | 3/1972 | Kersch et al. | 356/347 |
| 4,506,981 | 3/1985 | Hoff | 356/347 |
| 4,682,892 | 7/1987 | Ghanla | 356/347 |

Primary Examiner—Samuel Turner
Attorney, Agent, or Firm—Krass & Young

[57] ABSTRACT

The present invention relates to a test block for use with interferometric analysis apperatus which simulates defects of known dimension in a test object. The known defects created by cavities in the test block which is positioned within the interferometric analysis apparatus test chamber for analysis to determine whether the apparatus is properly calibrated. The cavities have a predetermined geometry and location within the test block which control flexure of a sheet of flexible material associated with the test block. The predetermined flexure can be correctly detected only by a properly calibrated interferometric device. The test block provides for a vent line to communicate with the cavities when the test block is placed inside a vacuum chamber associated with the interferometric analysis device to allow a pressure differential to create the forces for the predetermined fixture.

28 Claims, 5 Drawing Sheets

_Fig-3_

_Fig-4_

INTERFEROMETRIC TEST STANDARD

FIELD OF THE INVENTION

The present invention relates generally to apparatus for calibrating interferometric apparatus used in detecting anomalies within objects.

BACKGROUND OF THE INVENTION

Interferometric analysis provides a nondestructive method of determining the presence or absence of anomalies in an object. Interferometric apparatus typically use holography or shearography techniques to compare images of an object taken both before and after an applied stress. Essentially, this apparatus analyzes the deformation associated with the applied stress to detect irregularities in deformation associated with anomalies within the object. A typical use for interferometric analysis occurs in the production of vehicle tires to inspect for internal defects.

Generally, a tire is placed inside a vacuum chamber and an image of one section of the surface of the tire is recorded before the application of the vacuum. After the initial recording, the tire is stressed by the application of a vacuum inside the chamber, and an image of the surface of the tire is again recorded. By superimposing the pair of images for deviations in the pattern of deformation, internal anomalies can be detected.

More specifically, in the technique of holographic interferometry, an object, such as a tire, is illuminated with coherent light, and an image of the interference pattern of reflected light from the object's surface is recorded. The object is thereafter stressed, such as by a change of temperature or pressure, and a second interference pattern is recorded in similar fashion. A hologram, developed from the pair of recorded images, is illuminated with the appropriate reconstructing light beam. This process produces an image of the illuminated object which includes superimposed fringe lines resulting from the interference between the two previously created interference patterns. These fringe lines represent contours of equal displacement of the object's surface, revealing the existence of undesirable strains in the object.

The technique of shearographic interferometry creates an interferogram by producing a pair of images of the object, shifted relative to one another, through an optical system such as a lens and wedge array. The pair of overlapping images produced by the lens and wedge array form an interferogram. When two interferograms formed of an object in two states of stress are caused to interfere with one another, the resulting interference pattern contains fringes corresponding to contours of constant strain.

Both types of interferometric analysis are discussed in the inventor's prior U.S. Pat. Nos.; 4,139,302 for a method and apparatus for interferometric deformation analysis, and 4,690,552 for an optical method and apparatus for strain analysis. These patents provide further background on the different techniques of interferometric analysis.

In any type of interferometric apparatus, an interference pattern must detect minute deviations during object deformation. The coherent light source power and beam ratios, vacuum levels, exposure variables, and the associated apparatus placement angles must be calibrated for optimum operation. Proper calibration of all these factors must be maintained to correctly detect different types of anomalies in an object, at various positions and depths.

While recording an image, an improperly calibrated interferometric device may not detect anomalies in a particular area of view, or throughout the entire area of view. Further, the device may appear to detect a nonexistent anomaly or an anomaly of incorrect proportion. Unfortunately, there is no nondestructive method to determine whether the device has correctly identified all anomalies in a given object.

Consequently, a need exists for determining whether individual interferometric devices are properly calibrated, and, if not properly calibrated, the specific area or areas of view where recalibration is necessary.

SUMMARY OF THE INVENTION

The present invention relates to a test block for use with interferometric analysis apparatus which simulates defects of known dimension in a test object. The known defects created in the test block are positioned within the interferometric analysis apparatus test chamber for analysis to determine whether the apparatus is properly calibrated. The defects have a predetermined geometry and location which can be correctly detected only by a properly calibrated interferometric device.

The test block is constructed of several layers of differing materials which cooperate to simulate a defect in a vehicle tire. These layers include a uniform layer of flexible rubber material having a reflective surface which simulates the surface reflective properties of a vehicle tire. Further, the flexible layer, like a tire, deforms under stress.

A layer of rigid aluminum is disposed proximate the flexible layer. The rigid layer contains one or more void areas or cavities. Where the rigid aluminum is bonded to the rubber layer, it substantially reduces deformation of the rubber under stress. However, where the cavities exist, the rubber layer is not bonded to the rigid substrate and will deform under stress, such deformation being proportionate to the geometry and depth of the particular cavity.

A final capping member of rigid material disposed proximate the rigid aluminum layer serves to atmospherically isolate the cavities and the associated areas in the rubber layer. This layer is preferably made of clear acrylic to permit viewing of the cavities or void areas. Alternatively, if substantial stress is anticipated, the capping member is formed of a metal so as not to substantially deform in use. A diagram indicating the areas corresponding to the cavities would then be drawn on the rubber layer on the identifying the cavity locations. A nozzle, disposed on this capping member, connects the cavities to a first atmospheric pressure source. The cavities are interconnected via ducts providing free communication between the cavities and the first atmospheric pressure source. The first atmospheric pressure source is preferably a vent line communicating with the outside atmosphere. Thus, the cavities contain air at atmospheric pressure. Since the defects in the tires produced at the same location also contain air at atmospheric pressure, this provides the interferometric apparatus with a standard comparable to the atmospheric pressures associated with internal defects of tires.

The test block is mounted on an adjustable and portable stand. A releasable clamp disposed on vertical shaft allows for vertical adjustment of the test block. Further, the clamp allows for rotation of the test block about a horizontal axis. The adjustability and portability features allow the test block to be positioned in virtually any orientation to simulate any location on a surface of a tire.

In this manner, the test block can be inserted into an interferometric device test chamber and images recorded, as if the test block were a vehicle tire. The interferometric device will typically produce a vacuum in the chamber, while the vent line communicates with the void areas, venting them to the atmospheric normal pressure. The greater internal atmospheric pressure causes a unique deformation of the rubber layer determined by the dimensions of the void area associated therewith. In this manner, a predetermined deformation can be positioned in any given area of view of an interferometric device. The results of the interferometric analysis can then be compared to a predetermined standard readout for a given test block to determine if the device is properly calibrated.

BRIEF DESCRIPTION OF THE DRAWINGS

These and other objects and aspects of the present invention will become clear from the following description of the invention, in which.

DESCRIPTION OF THE PREFERRED EMBODIMENT

Figure 1:
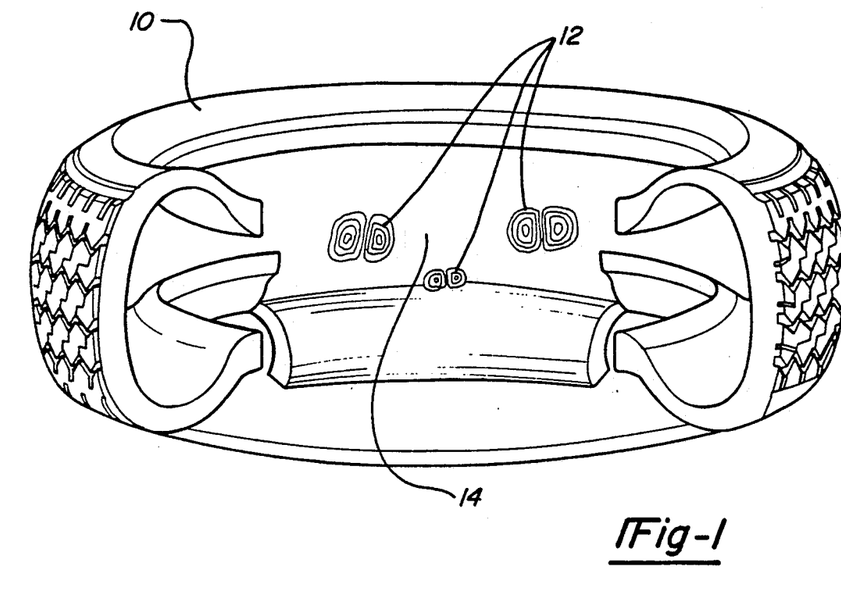
FIG. 1 is a representative cutaway view of the inside face of a vehicle tire showing relative placement of fringe patterns.

With reference to FIG. 1, a vehicle tire 10 is tested by interferometric analysis of the tire surface 14. By way of example, the shearographic technique described previously would produce fringe patterns 12 in the areas on the tire surface 14 corresponding to anomalies within the vehicle tire 10, such as ply separations, chord ruptures, improper repair patches and the like. A properly calibrated interferometric device would produce fringe patterns 12 of a size proportionate to the size of the internal defects. However, an uncalibrated interferometric device may fail to reveal defects which are present, or may produce a fringe pattern which is not proportionate to the actual defect. Further, there is no way to nondestructively verify the existence of defects in a vehicle tire.

Figure 2:
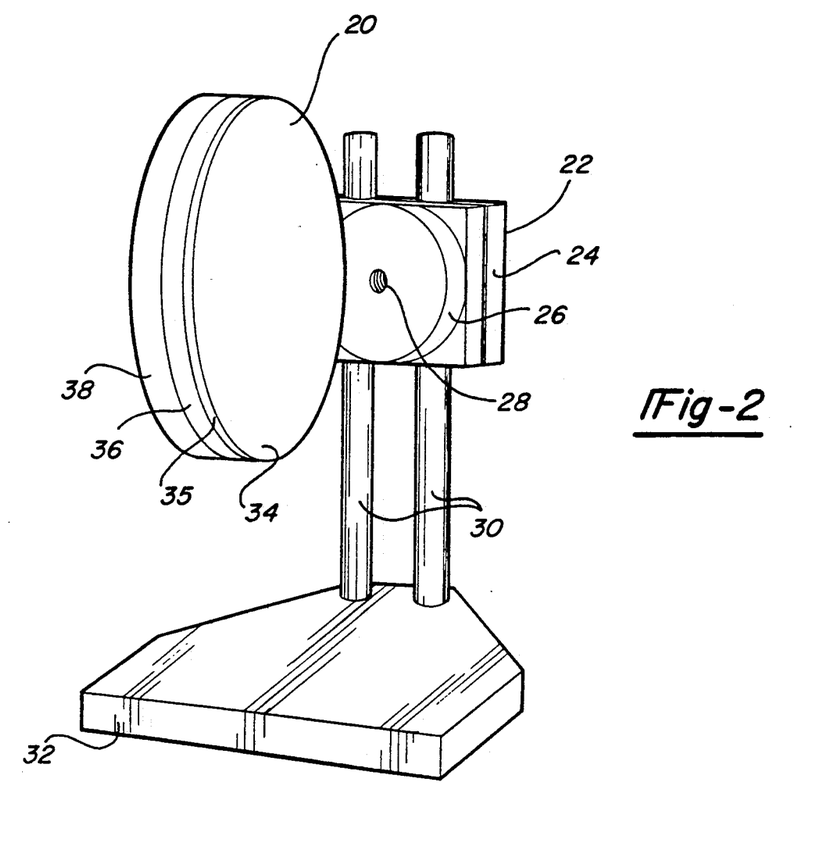
FIG. 2 is a perspective view of the invention showing the planar sheet of flexible material.

With reference to FIG. 2, a test block 20 provides a basis for testing interferometric apparatus by providing the ability to place a known defect at a known location within an interferometric analysis, device. The test block 20 is disposed on a fixture 22 which adjusts to position the test block in a variety of locations to simulate a variety of defect types. Test block 20 attaches to pivot block 26 by means of a pair of metal screws (not shown) or similar attachment devices. Test block 20 can be configured with attachment openings 25 to facilitate attachment to pivot block 26 (shown on FIG. 4). Pivot block 26 attaches to fixture block 24 through the use of a centrally mounted screw means 28. The screw means 28 includes an end cap configured to be manually manipulatable without the use of tools (shown in FIG. 3). Through the use of the pivot block 26 the test block 20 can be pivoted about a substantially horizontal axis to simulate the various angled surfaces on the interior of the vehicle tire 10. The horizontal axis corresponds to the screw means 28 which secures the pivot block 26 to the fixture block 24. The fixture block 24 engages a pair of parallel vertically extending bars 30 attached to base 32. The fixture block 24 is further configured in sections so that screw means 28 secures the fixture block 24 in position on the vertical bars 30. In this manner, a single screw means 28 is utilized to adjust the placement of the test block 20 both vertically and pivotably about a substantially horizontal axis. The base 32, preferably constructed of a metal such as steel, provides a platform for placement of the test block 20 within an interferometric device (not shown). Further, the base 32, having a relatively large mass and being constructed of metal, provides a low overall center of gravity which allows the test block to be unaffected by slight disturbances.

The test block 20 is built from several different materials which interact to simulate the image of a known anomaly when subjected to interferometric testing. One outside face of the block 20 includes a sheet 34 of elastomeric material, such as neoprene rubber, bonded to a planar face 35 of a body 36 of rigid material. The body 36 preferably is constructed of aluminum to provide a lightweight test block 20, thereby maintaining the low center of gravity of the overall embodiment and allowing for easy machinability and resistance to corrosion, as will hereinafter be described. The sheet 34, preferably of neoprene rubber, provides a reflective surface which emulates the reflective properties of the surface of a vehicle tire.

Figure 3:
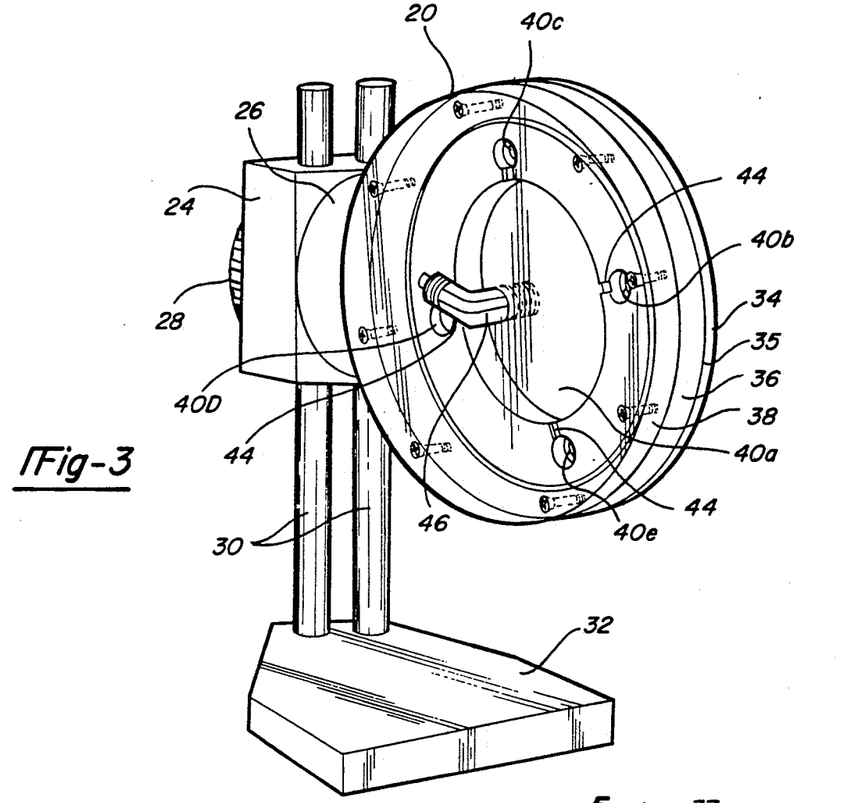
FIG. 3 is a perspective view of the invention showing the opposite side of a first embodiment of the invention.
Figure 4:
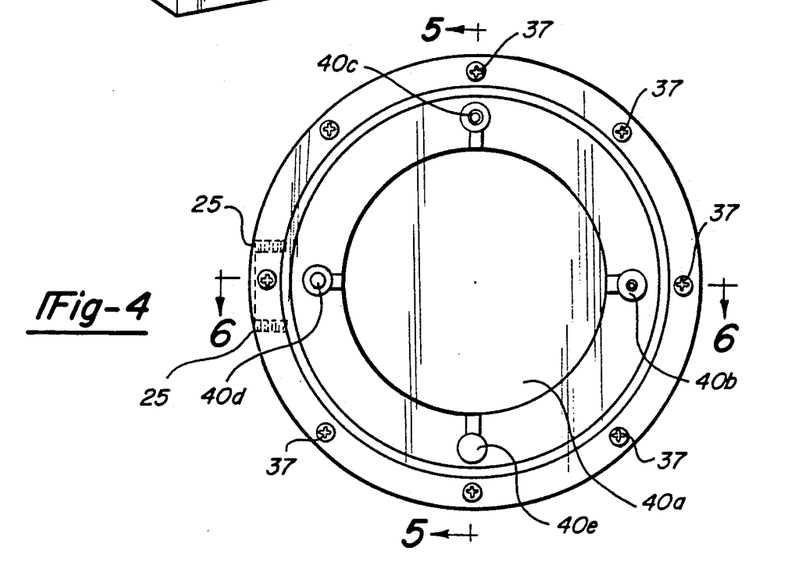
FIG. 4 is a plan view of the first embodiment.
Figures 5, 6:
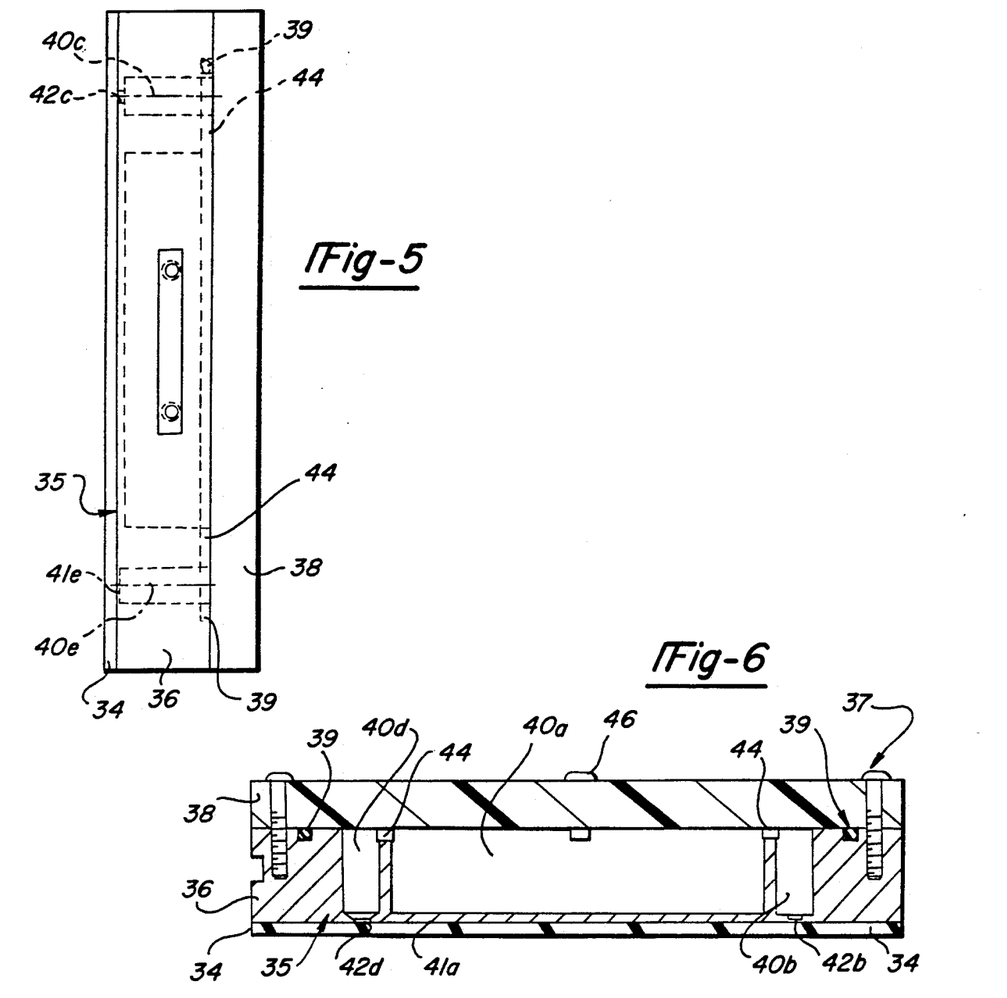
FIG. 5 is a cross-section view of the first embodiment along line 5—5 of FIG. 4.
FIG. 6 is a cross-section view of the first embodiment along line 6—6 of FIG. 4.

With reference to FIG. 3, the opposite outside face of the test block 20 includes a clear acrylic capping member 38 which allows viewing of the internal configuration of the body 36. Alternatively, to resist excessively high stress, the capping member 38 can be made of an opaque metal and a diagram of the internal cavities 40 can be drawn on the sheet 34 to indicate the location of the internal cavities 40. The body 36 preferably includes several cavities 40 machined therein. These cavities 40 cause the deformation of the sheet 34 and allow the interferometric analysis apparatus to detect the deformation created by the cavities 40. Further, by varying the dimension and depth of the void areas, different defects can be simulated.

The basic operation of the test block 20 involves the interaction of the rigid body 36 with the flexible sheet 34 under stress. The sheet 34 will not deform where it is bonded to solid body 36; i.e., where there are no cavities 40. The cavities 40 in the body 36 allow the sheet 34 to deform.

The cavities 40 may or may not communicate with the face 35 of the body 36 upon which is bonded to sheet 34. When a cavity 40 includes an opening through to and on the face 35 of body 36, the relative deformation of the sheet 34 associated with that location is controlled by the flexure properties of the sheet 34 alone.

Alternatively, a given cavity 40 may be separated from face 35 by a relatively thin wall of material. The cavity does not communicate with the face 35, but rather terminates short of and is isolated from the face 35. Thus, the relative deformation associated with that cavity 40 is controlled by the flexure properties of the sheet 34 in conjunction with those of the thin wall of material between the cavity and the face 35. The thicker the thin wall, the less it will deform and the greater will be the depth of the defect which the cavity simulates. Using this fact, a single uniformly dimensioned sheet 34 of flexible material can imitate the deformation associated with defects located at a greater variety of depths in a tire than would be the case if deformation depended solely on the thickness of sheet 34. Further, multiple cavities 40 and cavities 40 within cavities 40 can be created to simulate single and multiple defects at various depths within a tire without the need to vary the thickness of sheet 34.

Thus, there are two aspects of the cavities which influence the image eventually produced. The overall profile of the cavity simulates the various types of defects associated with a tire. The degree to which the cavity communicates with the face 35 and the sheet 34 simulates the relative depth of the defined defect within a tire.

Specifically, with reference to FIGS. 3, 4, 5 and 6, a first embodiment of the test block 20 utilizes five (5) cavities 40. Centrally disposed cavity 40A preferably has a 100 mm diameter and is separated from face 35 by a uniform 2 mm wall 41A. Cavity 40B provides for a 1 mm circular opening 42B on face 35. To facilitate the intercommunication of the cavities 40 and ease machining thereof cavities of small dimension such as cavity 40B, are countersunk with a relatively large diameter. Cavity 40B includes a 10 mm diameter countersink for this purpose. Cavity 40C provides for a 3 mm diameter circular opening 42C on face 35. Cavity 40D provides for a 5 mm diameter circular opening 42D on face 35. Finally, cavity 40E includes a uniform 10 mm diameter cavity separated from face 35 by a uniform 0.25 mm wall 41E. In this embodiment several small diameter cavities are distributed about a large central cavity, and the cavities are further configured to simulate various anomaly depths within a tire.

The body 36 is atmospherically sealed on the first side by the sheet 34 bonded thereto. On the second side, body 36 is atmospherically sealed by the capping member 38, screw means 37, and O-ring 39. Screw means 37 engages body 36 in non-critical areas, compressing O-ring 39 between the capping member 38 and body 36 sealing the test block 20.

Stress is applied to the test block, in a manner analogous to that used by the interferometric apparatus, to cause a detectable deformation. Passage ways 44, sealed by capping member 38, communicate with all of the cavities 40 located within body 36 to remain in fluid communication with the atmosphere. A port 46 attached to capping member 38 provides an external access to the internal passageways 44 and cavities 40. In this configuration, the invention can be placed inside the vacuum chamber of the interferometric apparatus to be calibrated. A vent line, venting the cavities 40 to atmospheric normal pressure at the given location, connects to the port 46. Upon evacuating the chamber, the pressure differential between the normal pressure associated with the cavities 40 and the vacuum associated with the exterior of the test block 20 will create a deformation area corresponding to each cavity 40.

Another example of a test block 20 configuration, illustrated in FIGS. 8, 9, 10, 11 and 12, includes elliptical and linear cavities 40. Cavities 40F and 40G provide a pair of 10 mm diameter cavities separated from face 35 by uniform 0.2 mm walls 41G, 41F. Cavity 40H provides a 5 mm diameter circular opening 42H on face 35. Cavity 40I provides a 30 mm diameter cavity separated from face 35 by a 0.8 mm uniform wall 41H. Cavity 40J provides for a 3 mm diameter circular opening 42J on face 35. Cavity 40K provides for a 40 mm diameter separated from face 35 by uniform 2 mm wall 41K. Cavity 40L provides for a 50 mm diameter cavity separated from face 35 by uniform 1.4 mm wall 41L. Cavity 40M provides for a 1 mm diameter circular opening 42M on face 35. Cavity 40N provides for a 30 mm long, 1 mm wide linear opening 42N on face 35, and cavity 40P provides for a 60 mm long, 1 mm wide linear opening 42P on face 35. These cavities 40 are also interconnected by passageways 44. This second embodiment of body 36 provides for several cross-sectional shapes as well as simulating various anomaly depths within a tire.

Elliptical cavities machined in body 36 simulate an image of defects caused by a separation of plys within a tire 10. Linear cavities 42 create an image of defects caused by an unbonded chord or unbonded belt edge separation in a single tire ply.

In use the test block 20 and fixture 22 are positioned within an interferometric analysis apparatus test chamber (not shown). The test block 20 is positioned in the window of view of the interferometer in a predetermined orientation to check the calibration thereof. Just like in interferometric testing of an object, an image of the test block 20 is recorded in an unstressed condition. The test block 20 is thereafter stressed by the imposition of differential atmospheric pressures. Since the vent line connected to port 46 vents the internal cavities 40 of test block 20 to outside atmospheric normal pressure at a given location, the cavities 40 will behave like actual defects in tires produced at the same location. The test chamber is evacuated to create a vacuum associated with the exterior of test block 20, which causes deformation of sheet 34 as controlled by cavities 40. A second image of the test block 20 is recorded. The two images are superimposed resulting in fringe patterns corresponding to the areas of deformation.

The test block 20 is preferably vented to atmospheric normal pressure to prevent the buildup of heat caused by the coherent light applied in the vacuum. Often, the test block must be repeatedly analyzed during the calibration process, and the vent line reduces the problem of heat buildup affecting the pressure differential. The venting of the test block further emulates the pressure found in a tire defect built at that given location. This creates a simulated defect which has an associated pressure consistent with the respective manufacturing facility.

Figure 7:
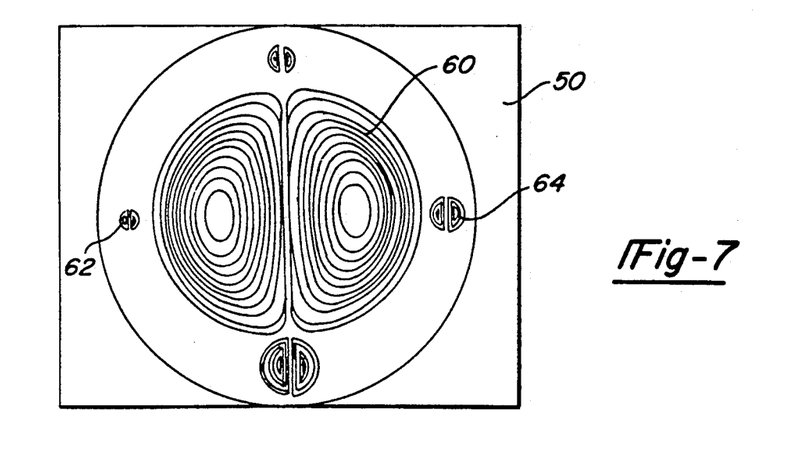
FIG. 7 is diagram of the predetermined standard corresponding to the first embodiment.
Figure 8:
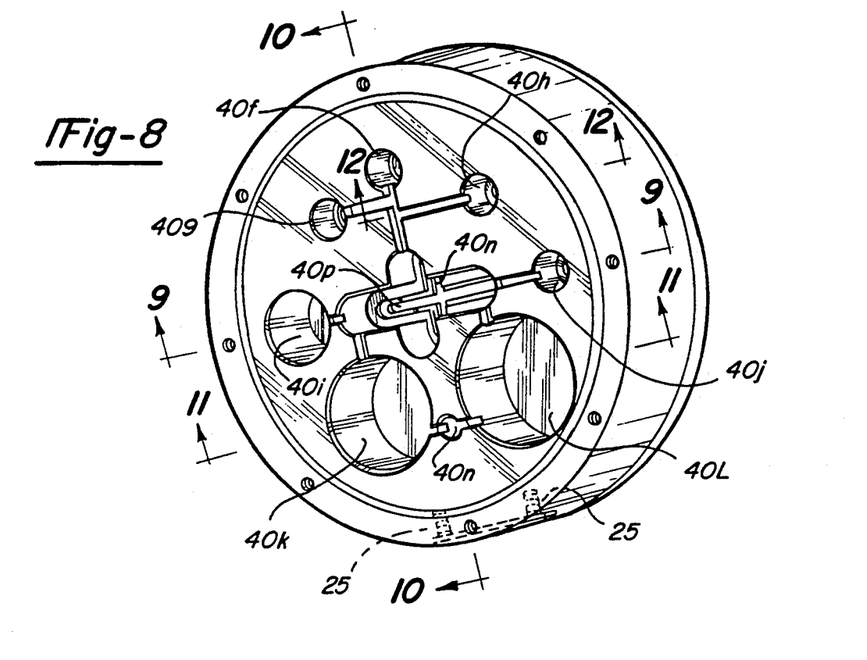
FIG. 8 is a plan view of a second embodiment of the invention.
Figure 9:
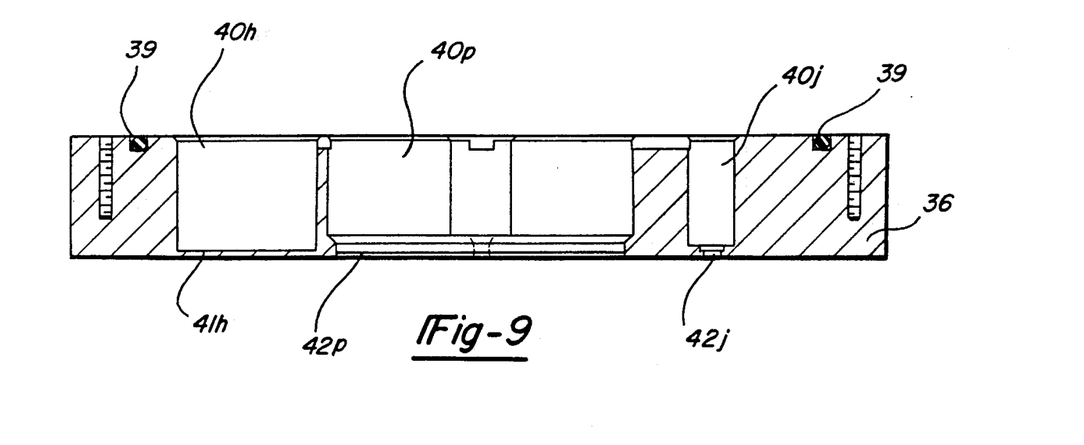
FIG. 9 is a cross-section view of the first embodiment along line 9—9 of FIG. 8.
Figure 10:
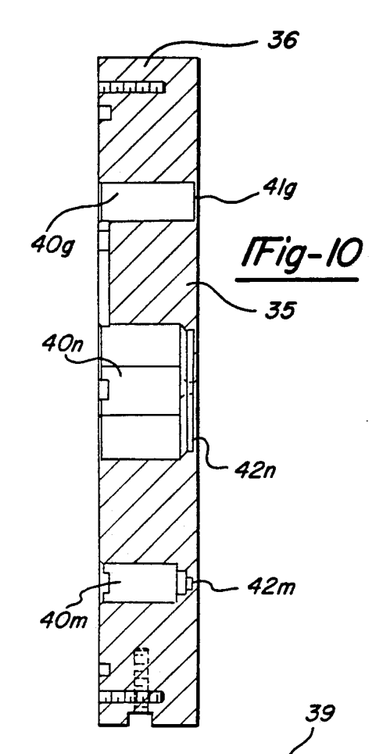
FIG. 10 is a cross-section view of the first embodiment along line 10—10 of FIG. 8.
Figure 11:
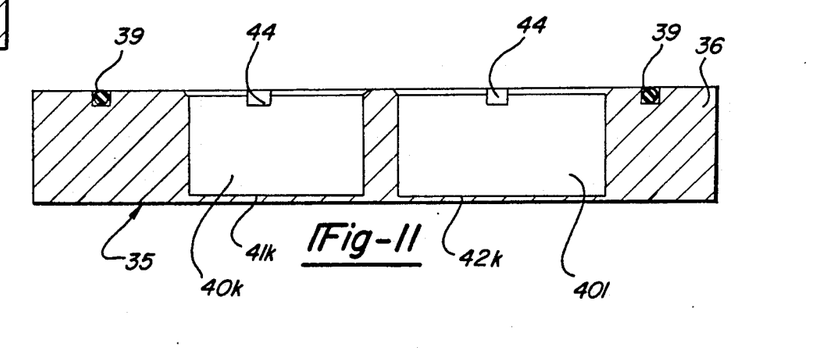
FIG. 11 is a cross-section view of the first embodiment along line 11—11 of FIG. 8.
Figure 12:
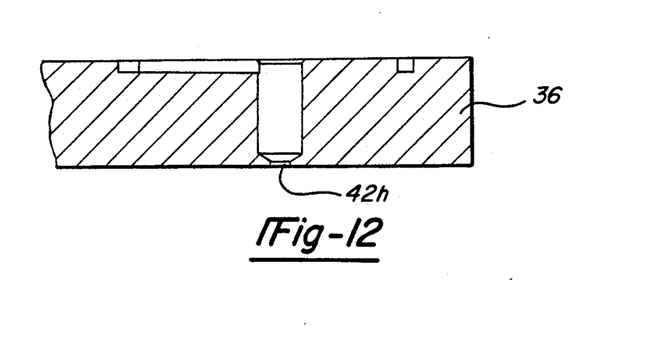
FIG. 12 is a cross-section view of the first embodiment along line 12—12 of FIG. 8.
Figure 13:
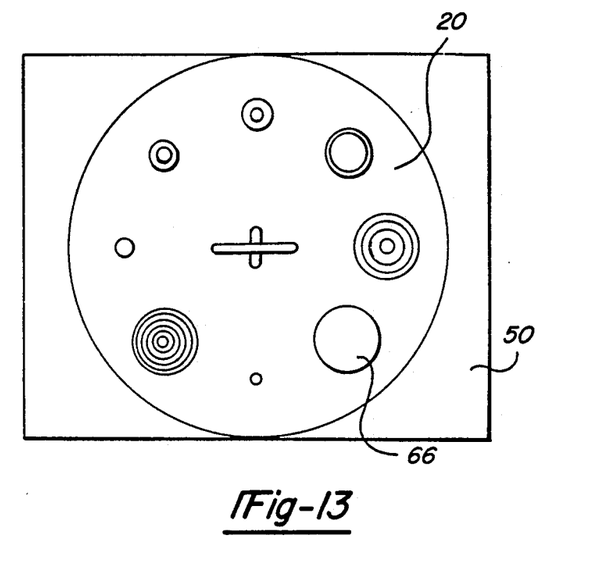
FIG. 13 is a diagram of the predetermined standard corresponding to the second embodiment.

Each test block has a predetermined standard result corresponding to a properly calibrated interferometric analysis of a given test block. FIG. 7 represents the standard result for the first embodiment of test block 20, and FIG. 13 represents the standard result for the second embodiment. For cavities 40 of a larger diameter, a larger fringe pattern results, such as fringe pattern 60 (FIG. 7) produced by a cavity 40A (FIG. 4) Correspondingly, smaller cavities, such as cavity 40B, produce smaller fringe patterns, such as pattern 62.

Where a cavity opens onto face 35, the sheet 34 deforms substantially, resulting in multiple closely spaced fringe lines 64 (FIG. 7). Where a wall, such as wall 41K, exists, deformation is retarded, producing only a few widely dispersed fringe lines, such as fringe lines 66 (FIG. 13). The walls correspond to various thickness of rubber tires above internal anomalies, which also retard deformation. The fringe lines, in this manner, act as contour lines showing the extent of deformation which corresponds to depths of defects in test objects.

Further, by providing a test block 20 having a plurality of cavities disposed to correspond with a substantial portion of the interferometric apparatus window of view 50. The apparatus can be checked for calibration over its entire field of view 50 by moving the test block 20 between relatively few positions within the apparatus for analysis.

Having thus described my invention, it can be seen that numerous alternative configurations can be envisioned without departing from the spirit of this invention. For example, the various shapes of cavities 40 having been described are not the only shapes of simulated defects coming within the scope of my invention. Further, a plurality of cavities 40 or a plurality of test blocks 20 could be utilized to fill the field of view 50. Different means of stressing the test block could also be envisioned.

I now claim:

1. An interferometric test block, for calibrating interferometric analysis apparatus comprising:
    a body of relatively rigid material having a first substantially planar face;
    a sheet of relatively flexible material supported by said body and bonded to said face; and
    means defining a cavity in said body, said cavity operable to weaken the support provided for the sheet by the body at that portion of said sheet overlying said cavity, so that when a predetermined deforming force is imposed on said test block, said overlying portion of sheet will deform, whereby interferometric measurements of said sheet before and after the imposition of said deforming force may be compared with a predetermined standard to calibrate said interferometric analysis apparatus.

2. The invention of claim 1, wherein said sheet of flexible material comprises an elastomeric material.

3. The invention of claim 2, wherein said sheet of flexible material comprises neoprene rubber.

4. The invention of claim 1, wherein said cavity formed in said body communicates with said planar face thereof.

5. The invention of claim 1, wherein said body includes a thin wall of said relatively rigid material disposed on said face overlying said cavity.

6. The invention of claim 1, wherein said cavity formed in said body opens onto said face and is configured to have a substantially linear cross section.

7. The invention of claim 1, wherein said test block further includes a capping member mounted on a second substantially planar face of said body.

8. The invention of claim 7, wherein said capping member is composed of a clear acrylic.

9. The invention of claim 7, wherein said test block further includes a passage having one end communicating with said cavity and a second end disposed on said capping member and terminating exterior of the test block.

10. The invention of claim 9, wherein a normal atmospheric vent line communicates with said second end of said passage so that the atmospheric pressure inside said cavity substantially equals the surrounding atmospheric at a given location.

11. The invention of claim 7, wherein said capping member is composed of a clear acrylic.

12. The invention of claim 1, further comprising a fixture supporting said test block in a given location relative to said interferometric analysis apparatus, said fixture being configured to allow said test block to pivot about a substantially horizontal axis.

13. The invention of claim 1, wherein said cavity has an elliptical cross section.

14. The invention of claim wherein said test block further includes indicia on said overlying portion of said sheet for visually determining the location of said cavity.

15. The invention of claim 1, wherein said test block includes a plurality of cavities.

16. The invention of claim 15, wherein said plurality of cavities have varying predetermined configurations.

17. An interferometric analysis apparatus test block, comprising:
    a body of relatively rigid material having a first substantially planar face;
    a sheet of relatively flexible material supported by said body and having one side bonded to said face;
    means defining a cavity in said body said cavity operable to weaken the support provided for the sheet by the body at that portion of the sheet overlying said cavity; and
    a capping member attached to said body and configured to atmospherically isolate said cavity so that when a predetermined deforming force is imposed on said test block, said overlying portion of said sheet will deform according to a predetermined standard whereby interferometric analysis apparatus measurements of the deformation of said sheet before and after the imposition of said deforming forces may be compared with said predetermined standard to calibrate said interferometric analysis apparatus.

18. The invention of claim 17, wherein said cavity formed in said body communicates with said planar face thereof.

19. The invention of claim 17, wherein said body terminates interiorly of said block to form a thin wall of said relatively rigid material between said cavity and said face.

20. The invention of claim 17, wherein said test block further includes a port opening through said capping member, said port configured to engage a normal atmospheric vent line, so that said cavity communicates with the ambient atmosphere.

21. The invention of claim 17, further including a fixture supporting said test block in a given location relative to said interferometric analysis apparatus, said fixture being configured to allow said test block to pivot about a substantially horizontal axis.

22. An interferometric analysis apparatus test standard, comprising:
    a sheet of relatively flexible elastomeric material;

a body of relatively rigid material, having first and second substantially planar face, said sheet being supported by and bonded to said first face, said body further including a plurality of cavities of varying predetermined dimensions, said plurality of cavities configured to weaken the support provided for the sheet by the body at predetermined locations on said sheet overlying said cavities;

a capping member attached to said second face of said body communicating with said plurality of cavities, said capping member having a port formed therethrough capable of communicating with a vent line to allow the pressure in said cavities to substantially equal the surrounding atmospheric pressure at a given location; and an adjustable fixture supporting said test standard in said interferometric apparatus, so that when a predetermined pressure differential is imposed on said test standard within said interferometric apparatus, said overlying portions of said sheet will each deform according to a predetermined standard, whereby interferometric measurements of the sheet before and after the imposition of the pressure differential may be compared with said predetermined standard to calibrate the interferometric analysis apparatus.

23. The invention of claim 22, wherein said fixture is further configured to pivot said test block about a substantially horizontal axis.

24. The method of calibrating an interferometric analysis device, comprising:

providing a test block having a sheet of flexible material bonded to a body of rigid material, said body of rigid material having at least one cavity formed therein to weaken the support provided for the sheet by said body;

positioning said test block within the test area of said interferometric analysis device;

recording a first interferometric image of said test block in an unstrained condition;

venting the interior of said test block to the normal atmospheric pressure at the location of the interferometric analysis device;

stressing the test block by the imposition of a vacuum to the exterior of the test block;

recording a second interferometric image of the test block in a strained condition;

comparing the first and second interferometric images of said test block to produce analysis results;

providing a standard analysis result for the given test block which depicts the interferometric analysis result of a properly calibrated interferometric analysis device; and comparing the analysis results to the standard analysis result.

25. The method of claim 24, wherein said test block includes indicia indicating the location of said cavity and said step of positioning includes the use of said indicia to precisely position said cavity within the field of view of said interferometric analysis apparatus.

26. The method of claim 24, wherein an adjustable fixture engages said test block, and said step of positioning further includes the step of adjusting said fixture to precisely position said test block within the field of view of said interferometric analysis apparatus.

27. The method of claim 26, wherein said adjusting of said fixture includes pivoting said test block about a substantially horizontal axis.

28. The method of claim 26, wherein said adjusting of said fixture includes vertically moving said test block.

* * * * *

UNITED STATES PATENT AND TRADEMARK OFFICE
CERTIFICATE OF CORRECTION

PATENT NO. : 5,007,738

DATED : April 16, 1991

INVENTOR(S) : Grant

It is certified that error appears in the above-identified patent and that said Letters Patent is hereby corrected as shown below:

Column 4, line 4, "analysis, device" should be --analysis device--;

Column 8, line 20, "claim wherein" should be --claim 1, wherein--.

Signed and Sealed this

Fifteenth Day of September, 1992

*Attest:*

DOUGLAS B. COMER

*Attesting Officer*   *Acting Commissioner of Patents and Trademarks*